United States Patent [19]
Yamazaki et al.

[11] Patent Number: 4,647,143
[45] Date of Patent: Mar. 3, 1987

[54] LIGHT-BEAM SCANNING APPARATUS

[75] Inventors: Kozo Yamazaki, Zama; Fumio Yamagishi, Ebina; Hiroyuki Ikeda, Yokohama; Hiroshi Watanuki, Tama; Mitsuharu Ishii, Inagi; Ichiro Sebata, Suginami; Takefumi Inagaki, Kawasaki, all of Japan

[73] Assignee: Fujitsu Limited, Kanagawa, Japan

[21] Appl. No.: 596,704

[22] Filed: Apr. 4, 1984

[30] Foreign Application Priority Data

Apr. 8, 1983 [JP] Japan .................. 58-061774

[51] Int. Cl.⁴ .................. G02B 26/10; G02B 26/08
[52] U.S. Cl. .................. 350/3.71; 350/6.2
[58] Field of Search .................. 350/3.71, 6.9, 6.2

[56] References Cited

U.S. PATENT DOCUMENTS 4,013,367  3/1977  Nagao et al. .................. 350/6.9

FOREIGN PATENT DOCUMENTS

0042946  1/1982  European Pat. Off. .......... 350/3.71
0069306  1/1983  European Pat. Off. .......... 350/3.71

Primary Examiner—John K. Corbin
Assistant Examiner—David J. Edmondson
Attorney, Agent, or Firm—Staas & Halsey

[57] ABSTRACT

Light-beam scanning apparatus mainly used for a bar-code reader in a point-of-sale system to identify sold articles. The apparatus includes a light-beam emitting device, a hologram disk having a plurality of hologram segments with different diffraction characteristics mounted along its circumference and being rotated at a predetermined speed, and a deflecting device for directing the emitted light beam from the light-beam emitting device to one side of the hologram disk in a first direction. The scanning apparatus has a first mirror group including a plurality of mirrors placed in a second direction corresponding to the other side of the hologram disk, each of which mirrors is arranged to receive a diffracted light beam from a corresponding hologram segment, and a second mirror group including a plurality of mirrors, each of which mirrors is placed to receive a light beam reflected by a corresponding mirror of the first mirror group and to reflect the incident light beam to a predetermined space positioned in the first direction where an article attached with a bar-code label is moved. In the apparatus, a light path from the other side of the hologram disk to the predetermined space has a predetermined length to form a predetermined scanning light pattern in the space.

20 Claims, 13 Drawing Figures

LIGHT-BEAM SCANNING APPARATUS

BACKGROUND OF THE INVENTION

The present invention relates to a light-beam scanning apparatus which generates multi-directional light-beams in a predetermined space, more particularly to a light-beam scanning apparatus used in a device for reading a bar-code attached on an article.

More and more supermarkets have been introducing point-of-sale (POS) systems to speed up check-out of sales and to improve inventory control.

A POS system makes use of a bar-code reader which reads bar-codes attached on articles and converts the read codes to data for computer processing; a computer which processes the data to identify the article, add the price code on the sales total, and enter the sale for inventory control; and a cash register connected between the bar-code reader and the computer which outputs the sales total for the cashier.

The bar-code reader includes a light-beam scanning apparatus. The light-beam scanning apparatus includes a light-beam emitting device, such as a laser tube, for providing a laser beam to a hologram disk rotating at a predetermined speed, a deflection system for deflecting the laser beam emitted from the laser tube to the hologram disk, a mirror system deflecting the laser beams diffracted by the hologram disk to form a desired scanning light pattern in a predetermined space, and a reading window placed in the path of the beams reflected from the final mirrors of the mirror system. The light-beam scanning apparatus further includes a light detector sensing the scattered light from the bar-code and converting the sensed signal to an electrical signal, and a decoding circuit.

A usual bar-code reader can read not only standard bar-code symbols of the Universal Product Code (UPC), European Article Number Code (EAN), Japanese Article Number (JAN), etc., but also the truncated symbols now in common use, wherein the length of the bars is reduced. To accomplish this, the light-beam scanning apparatus must provide a desired scanning line pattern consisting of a plurality of light beam traversing in multi-directions a predetermined zone of travel of an article.

U.S. patent applications having Ser. Nos. 162,867 and 162,868 both now abandoned (laid-open in corresponding Japanese Unexamined Patent Publication (Kokai) No. 57-44119) disclose light-beam scanning apparatuses which form light beam patterns consisting of multi-directional scanning lines for traversing the bar-code. In these apparatuses, the laser beam is emitted to the hologram disk from a position below the disk. The diffracted laser beams are directed to and deflected by a set of deflecting mirrors placed above the hologram disk to obtain a predetermined light path length. The beams are finally emitted to a scanning region of an article through a reading window. This optical system, however, results in a considerably large height from the bottom of the apparatus to the reading window. This is disadvantageous for recent POS systems, where the cashiers are seated behind the scanners rather than standing alongside them.

U.S. patent application having Ser. No. 271,344 now U.S. Pat. No. 4,415,224 (laid-open in corresponding Japanese Unexamined Patent Publication (Kokai) No. 57-204022) discloses a similar apparatus with an improved hologram disk to ensure correct bar-code reading. This apparatus, however, has the same optical configuration.

SUMMARY OF THE INVENTION

An object of the present invention is to provide a light-beam scanning apparatus which has a reduced height enabling seated operation in a POS system and which can form the desired light-beam pattern consisting of multi-directional lines to ensure correct bar-code scanning.

According to the present invention, there is provided a light-beam scanning apparatus comprising: a light-beam emitting means; a hologram disk having a plurality of hologram segments with different diffraction characteristics mounted along its circumference and being rotated at a predetermined speed; and a deflecting means, positioned in a first direction, for directing the emitted light beam from the light-beam emitting means to one side of the hologram disk. The scanning apparatus further comprises a first mirror means including a plurality of mirrors, positioned in a second direction corresponding to the other side of the hologram disk, each of which mirrors is arranged to receive a diffracted light beam from a corresponding hologram segment, and a second mirror means including a plurality of mirrors, each of which mirrors is arranged to receive a reflected light beam from a corresponding mirror of the first mirror means and to reflect the incident light beam to a predetermined space, positioned in the first direction. The light path from the other side of the hologram disk to the predetermined space has a predetermined length to form a predetermined scanning light-beam pattern in the space.

BRIEF DESCRIPTION OF THE DRAWINGS

Other objects and features of the present invention will be clearly understood from the following description with reference to the accompanying drawings, wherein.

DESCRIPTION OF THE PREFERRED EMBODIMENTS

Before describing preferred embodiments of the present invention, the general requirements for structure and size of a light-beam scanning apparatus built in a POS terminal and a prior art scanning apparatus will be briefly explained.

Figure 1A:
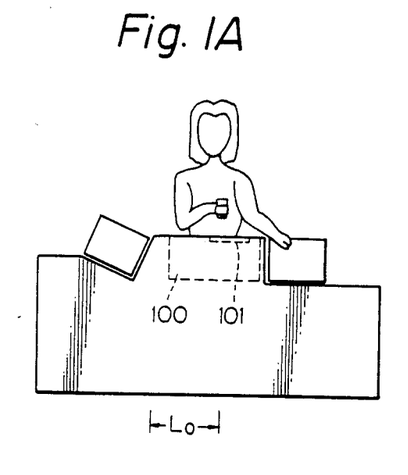
FIGS. 1A and 1B are views of a seated operation in a POS system.
Figure 1B:
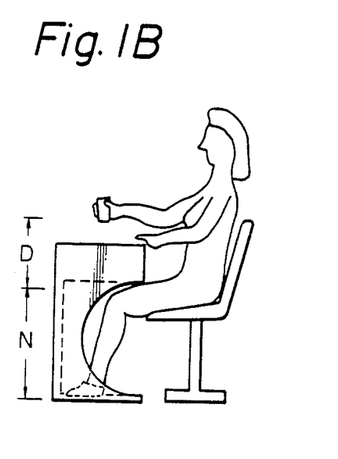

FIG. 1A is a front elevational view of a POS terminal with a built-in light-beam scanning apparatus 100. FIG. 1B is a side view of the POS terminal shown in FIG. 1A. As can be easily seen from FIGS. 1A and 1B, a minimum space N from the floor to knee, for example, approximately 600 mm, is required to permit seated operation. In addition, there is a maximum space D from the bottom of the apparatus to the level of article travel, for example 100 mm to 180 mm, beyond which check-out operation becomes difficult. Further, a predetermined space $L_0$, for example 100 mm to 150 mm, from the left side of the table in FIG. 1A to the portion above of a reading window 101 on which is formed a scanning light-beam pattern for reading a bar-code is required to move easily an article picked up from a shopping basket at the left in a scanning region above the reading window 101 and to ensure correct reading of the bar-code. If all the above conditions are not satisfied, an operator would be forced to work in an unnatural posture, resulting in physical fatigue and reducing work efficiency.

Irrespective of the above, there is the general requirement for as compact a size of an apparatus as possible for incorporation in a POS terminal.

Figure 2:
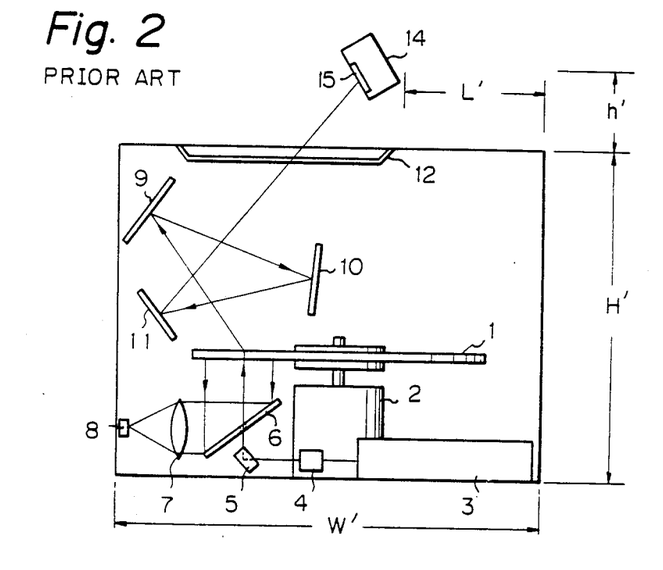
FIG. 2 is a sectional view of a prior art light-beam scanning apparatus.

FIG. 2 is a sectional view of a prior art light-beam scanning apparatus providing a multidirectional scanning light-beam pattern. In FIG. 2, only one optical system forming a scanning line in one direction is shown. A laser beam emitted from a laser tube 3 is applied to a beam expander 4.

The output beam strikes a mirror 5 and is reflected to the lower side of a hologram disk 1 through an aperture of a mirror 6. The hologram disk 1 includes a plurality of hologram segments, each having a predetermined diffraction characteristic to diffract the incident light. The hologram disk 1 is rotated at a predetermined speed by a motor 2. The light beams diffracted by the hologram segments strike a first mirror 9 to be reflected to a second mirror 10. The light beam striking the second mirror 10 is reflected to a third mirror 11 and then reflected out of a reading window 12 to a zone of travel of a moving article 14 with a bar-code label 15. Part of the scattered light from the bar-code reaches a light detector 8 through the window 12, the mirrors 11, 10, 9, the hologram disk 1, the mirror 6, and a convergent lens 7.

The light path from the upper side of an incident point in the hologram disk to the top of the zone of travel must be 300 to 500 mm so as to form the required scanning light pattern. In addition, the mirrors 9 to 11 must be as large as possible to best receive the scattered light from the bar-code.

Further, several sets of mirrors, for example, five sets, should be placed in the scanning apparatus to form the desired scanning light-beam pattern.

Other elements of the optical system are also large. For example, the diameter of the hologram disk is approximately 200 mm, and the length of the laser tube is approximately 300 mm.

Under these conditions, the minimum height H' of the scanning apparatus shown in FIG. 2 is approximately 220 mm. This is over the space D mentioned above with reference to FIGS. 1A and 1B. Here, it should be noted that the main reasons for the excess height are the location of the mirrors 9 to 11 above the hologram disk and application of the incident light beam from below the hologram disk. In addition, the space L' of the scanning apparatus shown in FIG. 2 is smaller than the above-mentioned space $L_0$.

Embodiments of the present invention will now be explained below.

Figure 3:
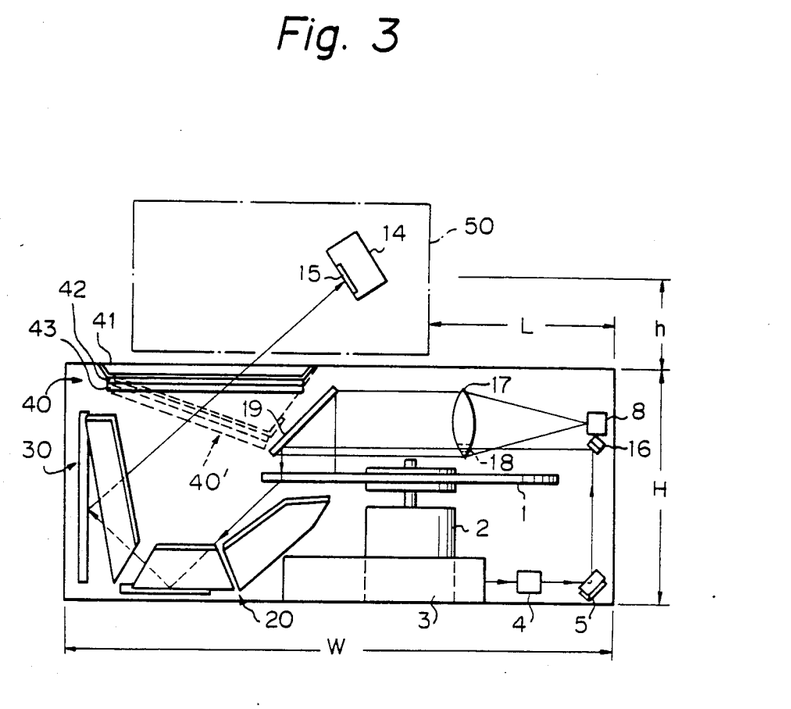
FIG. 3 is a sectional view of the light-beam scanning apparatus in accordance with the present invention.

FIG. 3 is a sectional view of a light-beam scanning apparatus in accordance with the present invention. In FIG. 3, a light-beam emitting device 3, for example, a helium-neon (He—Ne) laser tube, outputs a light beam to a beam expander or a collimator 4. The light beam, expanded to a predetermined diameter, strikes a first deflecting mirror 5 and is reflected to a second deflecting mirror 16.

The light beam reflected at the mirror 16 passes through a hole 18 of a convergent lens 17 and strikes a large mirror 19. The light beam reflected at the mirror 19 then strikes one side of a hologram disk 1. The hologram disk 1 includes a plurality of sector-shaped hologram segments, each having a predetermined diffraction characteristic.

The hologram disk 1 is rotated at a predetermined speed, for example, namely 3000 rpm to 6000 rpm, 6000 rpm in this embodiment, by a motor 2. The light beam strikes the face of the hologram disk 1 perpendicularly and is diffracted in accordance with the diffraction characteristics of the hologram segments, whereby one or more diffracted light beams are emitted to one of the mirrors of a first mirror group 20. The light beams reflected at the first mirror group 20 are further reflected at one of the mirrors of a second mirror group 30 and are emitted out of the scanning apparatus through a reading window 40 to scan a bar-code label 15 attached on an article 14.

Here, reference numeral 50 shows a zone of travel of the article 14, which ensures reliable reading of the bar-code.

Part of scattered light from the bar-code label 15 reaches a light detector 8 through the path of the reading window 40, the second mirror group 30, the first mirror group 20, the hologram disk 1, the large mirror 19, and the lens 17. The light converging at the detector 8 is converted into an electrical signal corresponding to the bar-code. The converted signal is further converted into a digital signal by an analog-to-digital converter (not shown in FIG. 2) and is decoded by a demodulator (not shown).

The lens 17 having the hole 18 functions to pass the light beam from the mirror 16 and to converge the scattered light to the detector 18.

Note that the light perpendicularly striking the hologram disk 1 is applied from above the hologram disk 1. Also note that the first mirror group 20 is placed below the hologram disk 1. In other words, the light is guided from the same direction as the reading window 40 to one face of the hologram disk 1 and is deflected by the hologram segments to the mirror group 20 below the hologram disk 1.

The second mirror group 30 is placed approximately vertically.

The light path from the incident point of the hologram disk 1 to the normal travelling level of the article is, for example, 300 mm to 500 mm. The height h shown in FIG. 3 indicates the normal travelling level, that is the typical level of, which is for example, 60 mm to 70 mm.

All of the optical elements mentioned above are sealed in the apparatus so as to prevent blocking by dust. The reading window 40 consists of a cover 41 having slits through which pass the emitted light and the scattered light and which cut off unnecessary received light, a glass 42, and a sealing glass 43. When the cover 41 and/or the glass 42 are removed to maintain the apparatus, for example, for cleaning the glasses, however, the sealing is maintained by the glass 43.

Figure 4A:
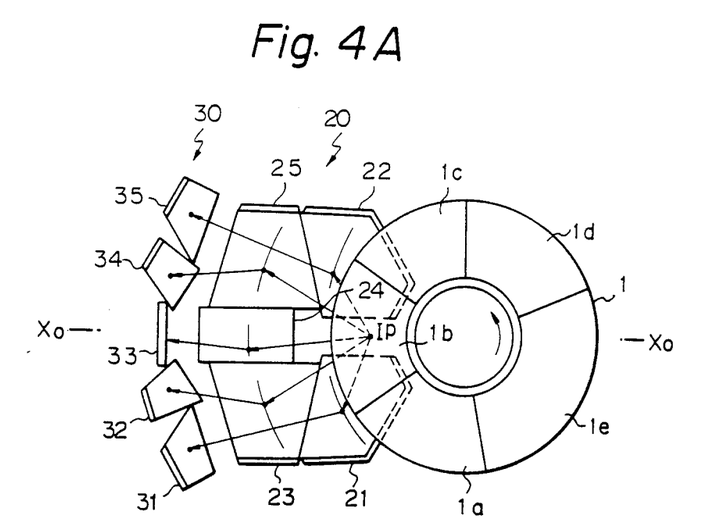
FIG. 4A is a plane view of an embodiment of the mirror arrangement shown in FIG. 3.
Figure 4B:
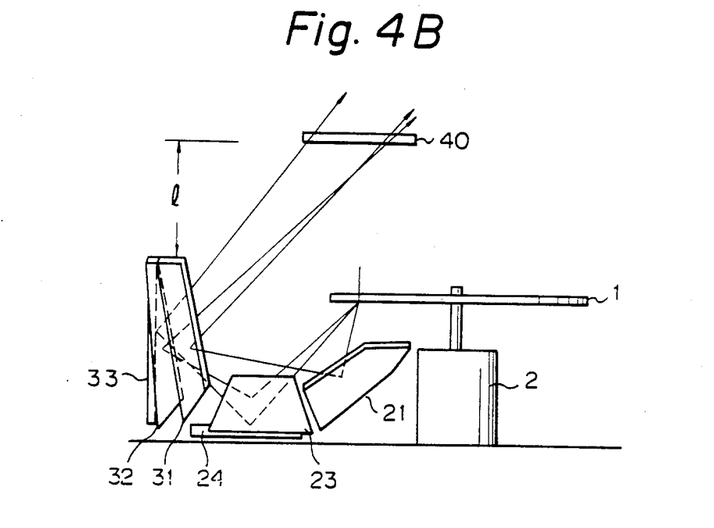
FIG. 4B is a sectional view of the mirror arrangement shown in FIG. 4A.

The detailed arrangement of the first and second mirror groups will now be described. FIGS. 4A and 4B are a plane view and a sectional view of a first example of a part of the optical system shown in FIG. 3. In FIGS. 4A and 4B, the first mirror group 20 consists of five mirrors 21 to 25. The second mirror group 30 also consists of five mirrors 31 to 35.

In FIG. 4A, the line $X_0-X_0$ indicates a center axis. First and second mirrors 21 and 22 are arranged near the bottom of the hologram disk 1. The mirrors 21 and 22 are symmetric about the center axis $X_0-X_0$. The mirrors 21 and 22 are inclined horizontally and vertically with respect to the center axis $X_0-X_0$ to receive diffracted light beams from the hologram segments 1a and 1b and to emit the reflected diffracted light beams to mirrors 31 and 35, respectively.

Third and fourth mirrors 23 and 25 are arranged adjacent to the mirrors 21 and 22, but away from the hologram disk 1. The mirrors 23 and 25 are symmetric about the center axis $X_0-X_0$. The mirrors 23 and 25 are inclined at least vertically with respect to the center axis $X_0-X_0$. The mirrors 23 and 25 receive diffracted light beams through the hologram segments 1c and 1e and reflect the received light beams to mirrors 32 and 34, respectively.

A fifth mirror 24 is disposed between the mirrors 23 and 25 at the bottom of the apparatus approximately parallel to the plane of the hologram disk 1. The mirror 24 receives the diffracted light beam through the hologram segment 1d and reflects the received light beam to a mirror 33.

The incident light on an incident light point IP on the top of the hologram disk 1 is diffracted as mentioned above due to the properties of each of the hologram segments.

The mirrors 31 and 35 are arranged symmetrically with respect to the center axis $X_0-X_0$ near the mirrors 23 and 25. The mirrors 31 and 35 are inclined inward horizontally and vertically with respect to the center axis $X_0-X_0$ and have steep angles with respect to the horizontal plane.

The mirrors 32 and 34 are arranged inside of the mirrors 31 and 35 similarly to the mirrors 31 and 35. The mirrors 32 and 34 have steeper angles than those of mirrors 31 and 35.

The center mirror 33 stands approximately vertical.

Light striking the mirrors 31 to 35 are reflected and emitted to the zone of travel 50 shown in FIG. 3.

The arrangement of the pairs of mirrors 21 and 31 to 22 and 35 defines the required light path length to form the desired scanning light-beam pattern in the zone of travel 50 on the basis of the characteristics of the hologram segments 1a to 1e.

While this arrangement of the optical system can significantly reduced the height H of the scanning apparatus, there are still limitations to this reduction due to the following reasons. The loci on the second mirrors 31 to 35 are completely separate from each other. To form the desired scanning light-beam pattern in the zone of travel above the reading window 40, a considerable distance l is required from the second mirrors 31 to 35 to the reading window 40, because the scanning light-beams reflected at the mirrors 32 and 34 have to be deflected inwardly to the center axis $X_0-X_0$ with a steep gradient angle with respect to the horizontal direction to make a desired pattern in a small distance. Unless this is done, the incident angle to the bar-code label may increase, the scattered light may decrease, and, consequently, the reading accuracy might be reduced.

Figure 5A:
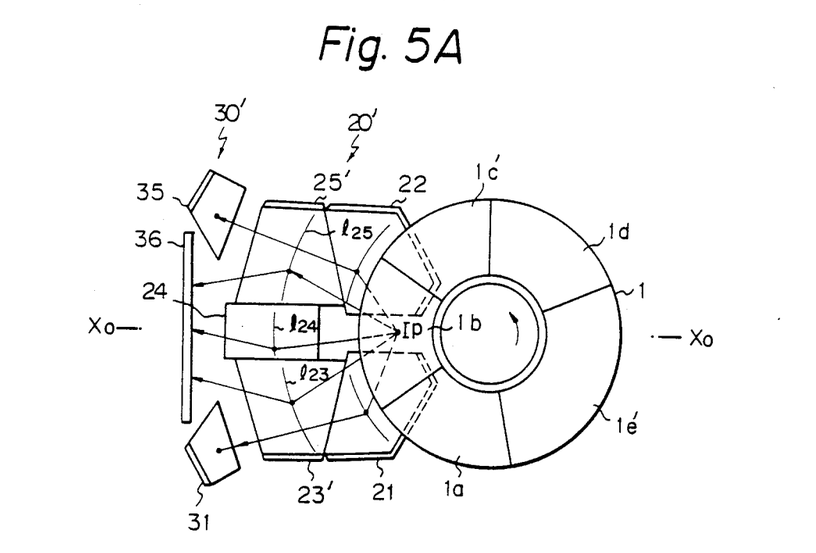
FIG. 5A is a plane view of another embodiment of the mirror arrangement shown in FIG. 3.
Figure 5B:
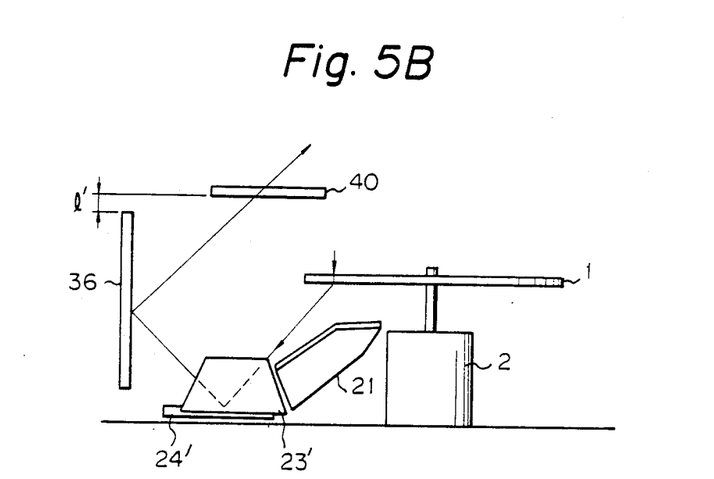
FIG. 5B is a sectional view of the mirror arrangement shown in FIG. 5A.

Another embodiment of the arrangement of the optical system shown in FIG. 3 will now be described. FIGS. 5A and 5B are plane and sectional views of the second embodiment. In FIGS. 5A and 5B, a first mirror group 20' consists of five mirrors 21, 22, 23', 24, and 25'. A second mirror group 30' consists of three mirrors 31, 36, and 35. The arrangements of the mirrors 21 and 22 of the first group and the corresponding mirrors 31 and 35 of the second group are the same as in FIGS. 4A and 4B. The arrangement of the mirror 24 is also the same as that in FIGS. 4A and 4B. The diffraction characteristics of the hologram segments 1a, 1b, and 1d are the same as those of the hologram segments shown in FIGS. 4A and 4B. However, the arrangements of the mirror 23' and 25' differ from those of the mirrors 23 and 25 shown in FIGS. 4A and 4B. The diffraction characteristics of the hologram segments 1c' and 1e' also differ from those of the hologram segments 1c and 1e. In FIGS. 5A and 5B, the mirrors 32, 33, and 34 shown in FIGS. 4A and 4B are deleted. A large mirror 36 replaces the mirrors 32, 33, and 34.

When the hologram segment 1a is at the incident light position IP, the diffracted light beam strikes the mirror 21. The light beam reflected at the mirror 21 strikes the mirror 31 and is reflected out the zone of travel. Similarly, the light beams diffracted by the hologram segments 1b and 1d strike the mirrors 22 and 24, respectively, and are reflected out to the zone of travel by the mirrors 35 and 36.

On the other hand, the light beams diffracted by the hologram segments 1c' and 1e' strike the mirrors 23' and 25', respectively, and are reflected by the mirrors 23' and 25' to the vertical mirror 36. The light beams reflected by the mirror 36 are emitted out to the zone of travel at a predetermined angle, for example, approximately 45° to the vertical, similarly to the light beams emitted from the mirror 24.

In this example, the vertical mirror 36 is larger than the mirror 33 shown in FIG. 4A and acts to reflect the light beams from the mirrors 23', 24, and 25'. The vertical mirror 36 is used in common for reflecting the above light beams, however, these light beams do not strike the mirror 36 simultaneously, because there are time lags between the striking of the light beams due to the time lags in passage of the hologram segments 1c', 1d and 1e, through the incident light point IP.

Figure 6:
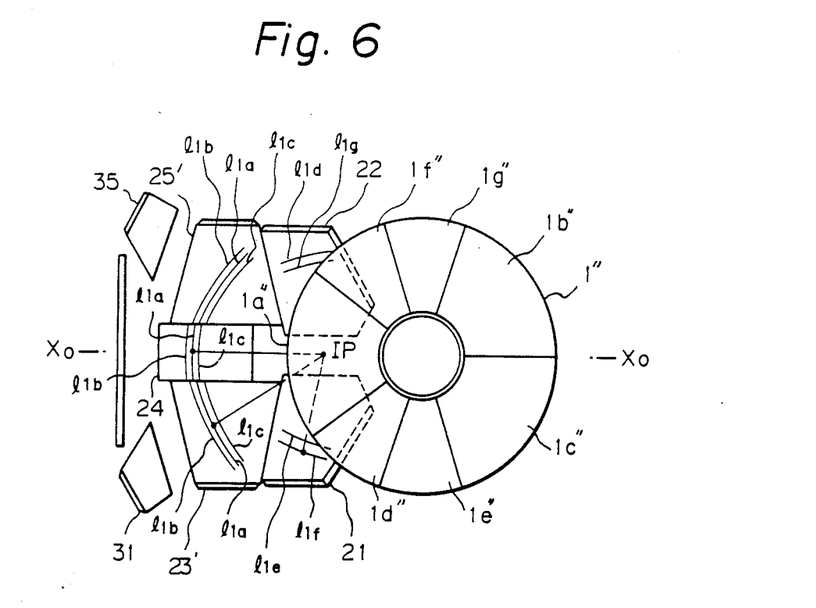
FIG. 6 illustrates in detail the diffracted and reflected light beams in the optical system shown in FIG. 5A.

For convenience of illustration in FIGS. 5A and 5B, only one locus of each diffracted light beams is shown on the mirrors. Actually, the diffracted light beams on each mirror can have several loci, for example two or three loci, to maintain standards for human eyes frequently subjected to the emitted light beams, and to increase the scattered light from the bar-code. In addition, as mentioned, each diffracted light beam from each hologram segment strikes each respective mirror of the second mirror group in FIGS. 4A to 5B. With reference to the several loci on each respective one of the mirrors of the first mirror group, it is clear that a of the diffracted light beam from each hologram segment can strike a plurality of respective mirrors of the first mirror group, for example, the loci $l_{1a}$, $l_{1b}$ and $l_{1c}$ for the mirrors 23', 24 or 25'. FIG. 6 shows an embodiment regarding this. In FIG. 6, a hologram disk 1" includes hologram segments 1a", 1b", 1c", 1d", 1e", 1f", and 1g". The hologram segments 1a", 1b", and 1c" have 72° sector angles. The hologram segments 1d", 1e", 1f", and 1g" have 36° sector angles. The diffracted light beam from the hologram segment 1a" strikes the mirrors 23', 24, and 25' and forms a locus $l_{1a}$. The diffracted light beams from the hologram segments 1b" and 1c" form loci $l_{1b}$ and $l_{1c}$, respectively. Similarly, the diffracted light beams from the hologram segments 1f" and 1c" strike the mirror 21 and form loci $l_{1f}$ and $l_{1c}$. The diffracted light beams from the hologram segments 1d" and 1g" strike the mirror 22 and form loci $l_{1d}$ and $l_{1g}$ on the mirror 22. The loci $l_{1a}$, $l_{1b}$ and $l_{1c}$ are adjacent to each other, because the diffraction characteristics of the hologram segments 1a", 1b", and 1c" are similar. The same is true for the relationship of the diffraction characteristics of the hologram segments 1e" and 1f" and 1d" and 1g".

Figure 7:
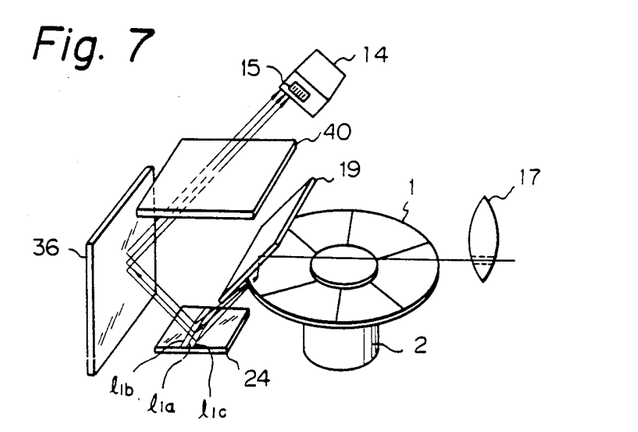
FIG. 7 is a perspective view of the optical system shown in FIG. 6.

FIG. 7 is a perspective view of the light beams emitted through the mirrors 24 and 36 in FIG. 6.

The operation of the apparatus shown in FIGS. 5A and 5B will be explained below.

Figure 8:
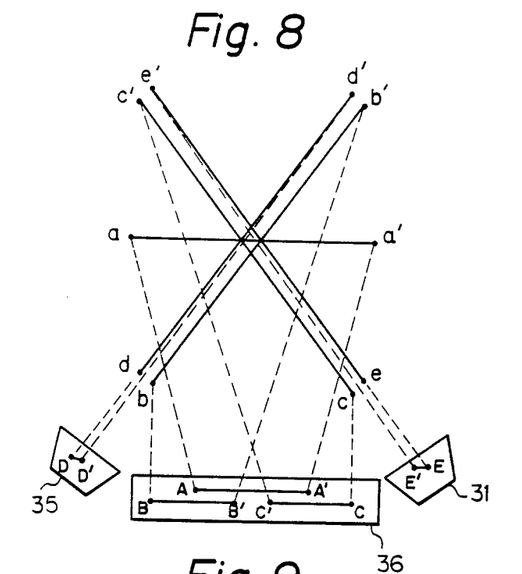
FIG. 8 represents scanning light-beam loci in accordance with the optical system shown in FIGS. 5A, 5B, 6, and 7.
Figure 9:
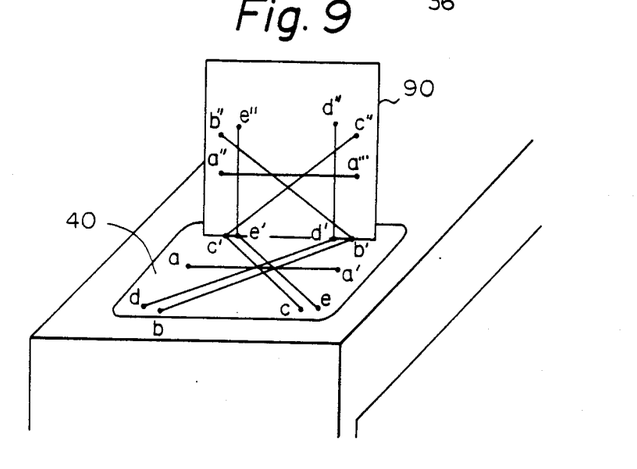
FIG. 9 represents a scanning light-beam pattern formed on a vertical plane.

FIG. 8 illustrates the loci of the incident light beam on the mirrors 31, 36, and 35 shown in FIGS. 5A and 5B and the scanning light-beam pattern on the window 40 reflected by the mirrors. FIG. 9 illustrates the scanning light-beam pattern on the window 40 and on the vertical plane 90. The vertical plane 90 occupies a part of the zone of travel 50. The light beam diffracted by the hologram segment 1d draws a locus $l_{24}$ on the mirror 24. The light beam reflected at the mirror 24 runs from a point A to a point A" on the mirror 36. The light beam reflected at the mirror 36 crosses from a point a to a point a' on the window 40. Finally, the light beam through the window 40 scans from a point a" to a point a''' on the plane 90. As mentioned above, the scanning line a" to a''' has two or more scanning beams.

Similarly, the light beams diffracted by the hologram segments 1a and 1b sweep the mirrors 31 and 35 as the lines E-E' and D-D'.

The light beams diffracted by the holograms segments 1c' and 1e' sweep the mirror 36 as the lines C-C' and B-B'.

Accordingly, a scanning light-beam pattern consisting of lines a'-a", b'-b", c'-c", d'-d", and e'-e" is formed on the plane 90. The lines b'-b" and c'-c" are inclined by about 50° to the horizontal line a"-a''' in this embodiment. The vertical lines c'-c" and d'-d" are perpendicular to the line a"-a'''.

In this embodiment, the mirror 36 is commonly used for reflecting the sweep lines A-A', B-B', and C-C'. The lines B-B' and C-C' are adjacent to the line A-A'. Consequently, the incident angles of the scanning light beams of the lines b'-b" and c'-c" are almost the same as that of the line a"-a'''. The incident angles to the plane 90 are approximately 45°. In other words, the angles of emission of the light beam from the window 40 to the horizontal plane is approximately 45° to ensure the illumination of the bar-code on the article travelling at a certain gradient normally having a range between the horizontal plane and the vertical plane. This results in highly reliable reading of the bar-code. According to the angle mentioned above, the amplitude of the scattered light at the bar-code is maximized, when the bar-code label is inclined by approximatey 45° to the horizontal plane.

The operation of the appratus shown in FIGS. 6 and 7 will be explained. The light beam diffracted by the hologram segment 1a" draws a locus $l_{1a}$ on the mirrors 23', 24, and 25'. The light beam reflected at the mirror 24 runs from a first point to a second point on the mirror 36 similar to the distance A-A' as shown in FIG. 8. The light beam reflected at the mirror 23' runs from a third point to a fourth point on the mirror 36 similar to the distance C-C' as shown in FIG. 8. The light beam reflected at the mirror 25' runs from a fifth point to a sixth point on the mirror 36 similar to the distance B-B' as shown in FIG. 8. Therefore, the light beam diffracted by the hologram segment 1a" forms scanning lines on the plane 90 similar to the lines a"-a''', b'-b" and c'-c" as shown in FIG. 9.

Similarly, the light beams diffracted by the hologram segments 1b" and 1c" form scanning lines on the plane 90 adjacent to the scanning lines formed by the light beam diffracted by the hologram segment 1a". The light beams diffracted by the hologram segments 1e" and 1f", and 1d" and 1g" form scanning lines on the plane 90 similar to the lines d'-d" and e'-e".

Under this condition, the distance l' shown in FIG. 5B is minimized, because the mirror 36 is used in common. Again, note that the desired scanning light-beam pattern having multi-directional light beams is formed. Therefore, when the article is moved in the zone of travel 50 in a usual manner, at least one scanning line crosses the bar-code.

In this embodiment, the diameter of the hologram disk 1 is 180 mm, the length of the laser tube 3 300 mm, the width W 380 mm, and the height H shown in FIG. 3 166 mm. The space L shown in FIG. 3 is greater than 150 mm when the window length is approximately 150 mm.

As can be easily understood from FIG. 3, the reading window 40 can be replaced to a reading window 40' indicated by dotted lines. The reading window 40' is inclined to the horizontal plane, i.e., the window 40' has a smaller incident angle of the emitted light beams than the window 40. Therefore, the transmision loss through the window 40' will be reduced over that of the window 40.

In FIG. 3, the deflecting means comprise the beam expander or the collimeter 4 and the mirrors 5, 16 and 19. Instead, a beam expander 4 can be placed between the mirrors 5 and 16 or 16 and 19. When the laser tube 3 is mounted above the hologram disk 1, the mirror 5 can be removed. Further, when the beam expander 4 is placed so its beam emitting output faces the aperture 18 of the lens 17, the mirror 16 can be removed.

Figure 10:
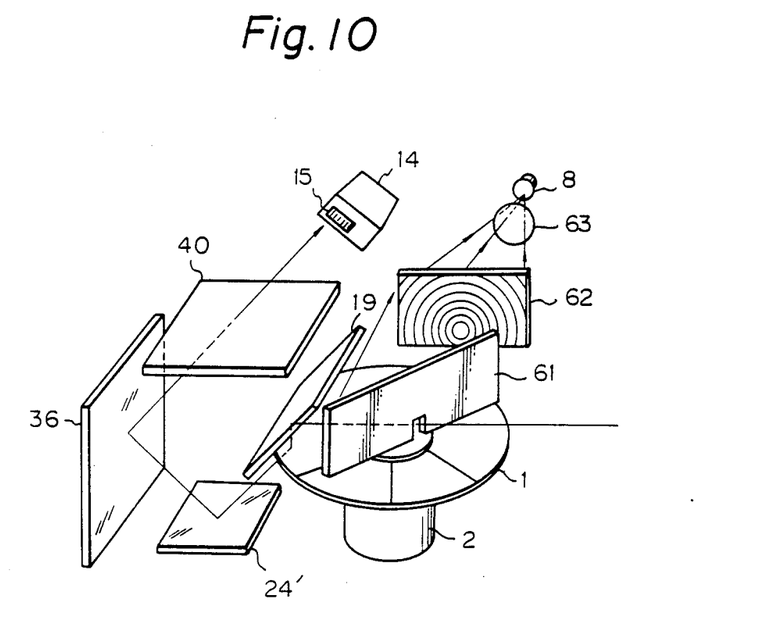
FIG. 10 is a perspective view of an alternative arrangement of the optical system in accordance with the present invention.

FIG. 10 shows another embodiment of the present invention. In FIG. 10, a mirror 61 with a hole for passing the incident light beam to the hologram disk 1 is mounted instead of the lens 17 shown in FIG. 3. The scattered light from the bar-code is deflected 90° by the mirror 61 and converges on the detector 8 through a Fresnel lens 62 and a filter 63. This arrangement of the optical system can further reduce the width of the apparatus.

We claim:

1. A light-beam scanning apparatus for reading a bar code on an article, comprising:
a light-beam emitting means;
a hologram disk having a plurality of hologram segments with different diffraction characteristics, mounted along its circumference and being rotated at a predetermined speed, wherein said light-beam emitting means is located on a first side of a first plane containing said hologram disk;
deflecting means, having respective parts located on both sides of said first plane, for directing the emitted light beam from the light-beam emitting means to the other side of said first plane and through said hologram disk toward said first side;
first mirror means including a plurality of mirrors corresponding to said hologram segments, located on said first side of said first plane, each of which mirrors is arranged to receive at least one diffracted light beam from at least one corresponding one of said hologram segments; and
second mirror means including a plurality of further mirrors, substantially located on said first side of said first plane, and between said hologram segments and a second plane perpendicular to said first plane, the number of said further mirrors being smaller than that of said first mirror means, and at least one of said further mirrors being substantially located on said second plane to receive a plurality of reflected light beams from a corresponding plurality of the mirrors of said first mirror means, each of said further mirrors being arranged to reflect each respective incident light beam to a space located on the other side of said first plane;
wherein a predetermined pattern of a plurality of scanning light beams is provided in said space for reading said bar code of an article when in said space.

2. A light-beam scanning apparatus according to claim 1, wherein the number of mirrors of the second mirror means is less than that of the first mirror means, and one of the mirrors of the second mirror means receives a plurality of light beams reflected by at least three mirrors of the first mirror means.

3. A light-beam apparatus according to claim 2, wherein the first mirror means includes five mirrors, and the second mirror means includes three mirrors, the center mirror of which is arranged and has a predetermined size to receive three incident light beams reflected from the three mirrors of the first mirror means and to reflect them to said space.

4. A light-beam scanning apparatus according to claim 3, said hologram disk having an axis of rotation, wherein:
first and second mirrors of the first mirror means are arranged with mirror symmetry with respect to a third plane containing said axis of rotation and being perpendicular to said first plane, the reflecting surfaces of said first and second mirrors being inclined toward each other and away from said first plane along a first direction in said third plane that is perpendicular to and away from said axis of rotation;
third and fourth mirrors of the first mirror means are arranged adjacent to said first and second mirrors, with mirror symmetry with respect to said third plane, and inclined at least by a rotation abut an axis parallel to said first direction so that the reflecting surfaces of said third and fourth mirrors are inclined toward each other;
a fifth mirror of said first mirror means is disposed between said third and fourth mirrors approximately parallel to said first plane containing the hologram disk;
first and second mirrors of the second mirror means are respectively arranged near the third and fourth mirrors of the first mirror means, with mirror symmetry with respect to said third plane, the reflecting surfaces of said first and second mirror of said second mirror means being inclined toward each other, and inclined toward the corresponding first and second mirrors of the first mirror means to receive the corresponding reflected light beams therefrom;
a third mirror of the second mirror means is disposed between said first and second mirrors and arranged substantially perpendicularly to said first direction to receive respective light beams reflected from the third to fifth mirrors of the first mirror means; and
each of the hologram segments included in the hologram disk has a predetermined diffraction characteristic to sweep at least one diffracted light beam on at least one corresponding mirror of the first mirror means so that at least five lines of scanning light beams result in a vertical plane located in said space for reading the bar code on each said article.

5. A light-beam scanning apparatus according to claim 4, wherein said five lines of scanning light beams in said vertical plane are a horizontal line reflected from the third mirror of the second mirror means, said horizontal line being parallel to said first plane and perpendicular to to said third plane, a pair of crossed slanted lines reflected from the third mirror of the second mirror means, and a pair of vertical lines reflected from the first and second mirrors of the second mirror means.

6. A light-beam scanning apparatus according to claim 5, wherein each of the five lines of the scanning light beams includes, in a horizontal plane in said space that is perpendicular to said vertical plane, at least two lines parallel to and adjacent to each other.

7. A light-beam scanning apparatus according to claim 1, wherein a reading window passing the scanning light beams and the reflecting light beams scattered by an object in said space is disposed between the second mirror means and said space.

8. A light-beam scanning apparatus according to claim 7, wherein said reading window is mounted and is inclined to have a small incident angle between its normal and the emitted light beams.

9. A light-beam scanning apparatus according to claim 8, wherein said reading window is placed near one end of the light-beam scanning apparatus in the longitudinal direction thereof to obtain a predetermined travelling length of the object for scanning.

10. A light-beam scanning apparatus according to claim 7, wherein said reading window is mounted parallel to the horizontal plane.

11. A light-beam scanning apparatus according to claim 10, wherein said reading window is placed near one end of the light-beam scanning apparatus in the longitudinal direction thereof to obtain a predetermined travelling length of the object for scanning.

12. A light-beam scanning apparatus according to claim 7, wherein a height from the bottom of the apparatus to the reading window is less than approximately 170 mm.

13. A light-beam scanning apparatus according to claim 1, said apparatus further comprising said deflecting means including second and third mirrors for said directing of said emitted light beam and a convex lens having a small hole disposed between the second and third mirrors of the deflecting means to pass the light emitted from second mirror and to converge scattered light corresponding to said incident light beam that is reflected back from said predetermined space.

14. A light-beam scanning apparatus according to claim 1, said deflecting means including a pair of mirrors and a further mirror having a small hole disposed between said pair of mirrors to pass the light emitted from the second mirror of said second mirror means and to change the direction of scattered light corresponding to said incident light beam that is reflected back from said predetermined space.

15. A light-beam scanning apparatus according to claim 1, wherein said light-beam emitting means is a helium.neon laser tube.

16. A light-beam scanning apparatus according to claim 1, wherein said deflecting means includes at least a beam expander or a collimater and at least one deflecting mirror between the light emitting means and the hologram disk.

17. A light-beam scanning apparatus according to claim 1, wherein said deflecting means includes a beam expander or a collimater and at least two deflecting mirrors between the light emitting means and the hologram disk.

18. A light-beam scanning apparatus according to claim 1, wherein said deflecting means includes a beam expander or a collimater and three deflecting mirrors between the light emitting means and the hologram disk.

19. A light-beam scanning apparatus according to claim 18, wherein said first and second mirror means have a center axis, said beam expander or collimater receives the light emitted from the light-beam emitting means, a first one of said deflecting mirrors of said deflecting means receives the light from said beam expander or collimater and reflects the incident light upward, a second one of said mirrors of said deflecting means receives the incident light reflected at said first mirror of said deflecting means and directs the received light in the same direction of said center axis, and the third deflecting mirror receives the light reflected at the second deflecting mirror and applies the received light to said one side of the hologram disk perpendicularly.

20. The apparatus of claim 1, wherein each said hologram segment provides a respective diffracted light beam for each respective combination of the mirrors of said first and second mirror means, and respective scanning light patterns along respective directions are formed in said predetermined space.

* * * * *

UNITED STATES PATENT AND TRADEMARK OFFICE
CERTIFICATE OF CORRECTION

PATENT NO. : 4,647,143
DATED : March 3, 1987
INVENTOR(S) : Kozo Yamazaki, Fumio Yamagishi, Hiroyuki Ikeda, Hiroshi Watanuki, Matsuhara Ishii, Ichiro Sebata and Takefumi Inagaki It is certified that error appears in the above-identified patent and that said Letters Patent is hereby corrected as shown below:

```
Column 1, line 33, after "tor" insert --for--;
          line 46, "patent application" should be
              --Patent Application--;
          line 64, "patent application" should be
              --Patent Application--.

Column 5, line 3, after "of" insert --the article
              having the bar code to be read--;
          line 68, "reduced" should be --reduce--.

Column 6, line 6, "l" should be --$\ell$--;
          line 61, "le" should be --le'--.
```

UNITED STATES PATENT AND TRADEMARK OFFICE
CERTIFICATE OF CORRECTION

PATENT NO. : 4,647,143

DATED : March 3, 1987

INVENTOR(S) : Kozo Yamazaki, Fumio Yamagishi, Hiroyuki Ikeda, Hiroshi Watanuki, Matsuhara Ishii, Ichiro Sebata and Takefumi Inagaki It is certified that error appears in the above-identified patent and that said Letters Patent is hereby corrected as shown below:

Column 7, line 8, "$1_{1a}$, $1_{1b}$, and $1_{1c}$" should be --$\ell_{1a}$, $\ell_{1b}$ and $\ell_{1c}$--;

line 16, "$1_{1a}$" should be --$\ell_{1a}$--;

line 17, "$1_{1b}$" should be --$\ell_{1b}$--;

line 18, "$1_{1c}$" should be --$\ell_{1c}$--;

line 19, "$1_c{}''$" should be --$1_e{}''$--;

line 20, "$1_{1f}$ and $1_{1e}$" should be --$\ell_{1f}$ and $\ell_{1e}$--;

line 22, "$1_{1d}$ and $1_{1g}$" should be --$\ell_{1d}$ and $\ell_{1g}$--;

line 23, "$1_{1a}$, $1_{1b}$ and $1_{1c}$" should be --$\ell_{1a}$, $\ell_{1b}$ and $\ell_{1c}$--;

line 40, "$1_{24}$" should be --$\ell_{24}$.

UNITED STATES PATENT AND TRADEMARK OFFICE
CERTIFICATE OF CORRECTION

PATENT NO. : 4,647,143

DATED : March 3, 1987

INVENTOR(S) : Kozo Yamazaki, et al

It is certified that error appears in the above-identified patent and that said Letters Patent is hereby corrected as shown below:

Column 8, line 11, "11a" should be -- $\ell_{1a}$ --;
line 31, "1'" should be -- $\ell'$ --.

Signed and Sealed this

Eighth Day of September, 1987

Attest:

DONALD J. QUIGG

Attesting Officer

Commissioner of Patents and Trademarks